United States Patent
Moser et al.

(10) Patent No.: US 12,493,497 B2
(45) Date of Patent: Dec. 9, 2025

(54) DETECTION AND HANDLING OF EXCESSIVE RESOURCE USAGE IN A DISTRIBUTED COMPUTING ENVIRONMENT

(71) Applicant: International Business Machines Corporation, Armonk, NY (US)

(72) Inventors: Simon Daniel Moser, Gärtringen (DE); Tareq Al-Maamari, Holzgerlingen (DE); Jan Zimbehl, Toronto (CA); Andrew Edgar, Regina (CA); Julian Mario Skupnjak, Hechingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 17/023,444

(22) Filed: Sep. 17, 2020

(65) Prior Publication Data

US 2022/0083397 A1 Mar. 17, 2022

(51) Int. Cl.
*G06F 9/50* (2006.01)
(52) U.S. Cl.
CPC ............ *G06F 9/5083* (2013.01); *G06F 9/505* (2013.01); *G06F 9/5072* (2013.01);
(Continued)
(58) Field of Classification Search
CPC ...... G06F 9/5083; G06F 9/505; G06F 9/5072; G06F 2209/5022; G06F 2209/505; G06F 9/5088
(Continued)

(56) References Cited

U.S. PATENT DOCUMENTS 6,272,641 B1 8/2001 Ji
7,581,125 B2 * 8/2009 Ranganathan ........ G06F 1/3296
713/340
(Continued)

FOREIGN PATENT DOCUMENTS

JP 2005-524886 A 8/2005
WO WO-2013048986 A1 * 4/2013 ........... H04L 41/147
WO 2016040201 A1 3/2016

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Michael W Ayers
(74) *Attorney, Agent, or Firm* — Rakesh Roy, Esq.; Heslin Rothenberg Farley & Mesiti P.C.; George S. Blasiak, Esq.

(57) ABSTRACT

A method, computer program product and computer system for predicting excessive resource usage in a distributed computing environment is provided. A processor retrieves a portion of code associated with a workload in a distributed computing environment. A processor retrieves account information associated with the workload. A processor determines a likelihood that the workload is indicative of excessive resource usage based on the portion of code and the account information associated with the workload. In response to the likelihood of excessive resource usage exceeding a threshold, a processor reschedules the workload in the distributed computing environment.

20 Claims, 6 Drawing Sheets

(52) U.S. Cl.
CPC .... *G06F 9/5088* (2013.01); *G06F 2209/5022* (2013.01); *G06F 2209/505* (2013.01)

(58) Field of Classification Search
USPC ......................................................... 718/105
See application file for complete search history.

(56) References Cited

U.S. PATENT DOCUMENTS

| | | | |
|---|---|---|---|
| 7,832,011 B2 | 11/2010 | Obrecht | |
| 8,291,411 B2 | 10/2012 | Beaty | |
| 8,572,623 B2* | 10/2013 | Bhogal | G06F 9/50 |
| | | | 718/104 |
| 8,612,580 B2* | 12/2013 | Gandhi | G06F 11/3433 |
| | | | 709/224 |
| 8,881,278 B2 | 11/2014 | Kaplan | |
| 9,329,904 B2* | 5/2016 | Wray | G06F 9/5072 |
| 9,361,140 B1 | 6/2016 | Gnanadason | |
| 9,367,355 B1* | 6/2016 | Schillings | G06F 9/5011 |
| 9,495,215 B2 | 11/2016 | Podvratnik | |
| 9,794,229 B2 | 10/2017 | Yu | |
| 10,331,462 B1* | 6/2019 | Varda | H04L 67/63 |
| 10,609,159 B2* | 3/2020 | Koppolu | H04L 67/61 |
| 11,080,125 B1* | 8/2021 | Raj | G06F 11/0709 |
| 11,175,951 B2* | 11/2021 | Saillet | G06F 9/4881 |
| 2007/0112723 A1* | 5/2007 | Alvarez | G06F 9/50 |
| 2008/0295096 A1 | 11/2008 | Beaty et al. | |
| 2011/0302655 A1 | 12/2011 | Tikkanen | |
| 2012/0131174 A1* | 5/2012 | Ferris | G06F 9/5083 |
| | | | 709/224 |
| 2013/0097601 A1 | 4/2013 | Podvratnik et al. | |
| 2013/0160022 A1* | 6/2013 | Blight | G06F 9/466 |
| | | | 718/104 |
| 2013/0212603 A1 | 8/2013 | Cooke et al. | |
| 2015/0052520 A1 | 2/2015 | Crowell | |
| 2016/0012224 A1 | 1/2016 | Zhou | |
| 2016/0080282 A1* | 3/2016 | Meijer | H04L 69/329 |
| | | | 709/226 |
| 2016/0170780 A1 | 6/2016 | Gnanadason et al. | |
| 2017/0083367 A1 | 3/2017 | Chen | |
| 2017/0169097 A1* | 6/2017 | Petri | G06F 9/46 |
| 2017/0223036 A1 | 8/2017 | Muddu | |
| 2017/0230389 A1 | 8/2017 | Cochenour | |
| 2017/0270460 A1* | 9/2017 | Dow | G06Q 10/063114 |
| 2018/0157535 A1* | 6/2018 | Dushok | G06F 11/3433 |
| 2019/0052575 A1 | 2/2019 | Kaminski | |
| 2020/0004600 A1 | 1/2020 | Acker | |
| 2020/0084219 A1 | 3/2020 | Sung et al. | |
| 2020/0151025 A1 | 5/2020 | Kinney et al. | |
| 2020/0257614 A1* | 8/2020 | Davis | G06F 11/3612 |
| 2021/0125128 A1* | 4/2021 | Martin | H04L 43/0876 |

OTHER PUBLICATIONS

"Patent Cooperation Treaty PCT International Search Report", International application No. PCT/IB2021/057398, International filing date Aug. 11, 2021, Date of mailing Sep. 28, 2021, 7 pages.
Japan Patent Office, "Decision to Grant a Patent" Feb. 19, 2025, 5 Pages. JP Application No. 2023-517691.

* cited by examiner

DETECTION AND HANDLING OF EXCESSIVE RESOURCE USAGE IN A DISTRIBUTED COMPUTING ENVIRONMENT

BACKGROUND OF THE INVENTION

The present invention relates generally to the field of resource provisioning, and more particularly to restricting resource usage to workloads in a distributed computing environment.

A distributed computing environment provides convenient, on-demand access to a shared pool of configurable computing resources that can be rapidly provisioned to users of the platform. The amount and type of resources can vary greatly between users based on the computing needs that the users require. Resource provisioning is the act of the distributed computing environment provider detecting and meeting the needs of each user's request to provide a seamless access to the vast computing power provided by the distributed computing environment.

SUMMARY

Embodiments of the present invention provide a method, computer system, and computer program product to predict excessive resource usage in a distributed computing environment. A processor retrieves a portion of code associated with a workload in a distributed computing environment. A processor retrieves account information associated with the workload. A processor determines a likelihood that the workload is indicative of excessive resource usage based on the portion of code and the account information associated with the workload. In response to the likelihood of excessive resource usage exceeding a threshold, a processor reschedules the workload in the distributed computing environment.

DETAILED DESCRIPTION

While distributed computing platforms provide unimaginable amounts of computing resources to users, excessive usage of those resources can impact other users as well as the overall efficiency of the platform. Detection and responding to users that deploying excessive amounts of resources can greatly improve the efficiency of the platform. Embodiments of the present invention improve on prior solutions of excessive resource usage in a distributed computing platform by looking beyond just the activities of a user by also incorporating more proactive measures and inspection of a user's activity as well as the code and resource usage the user employs from the platform.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
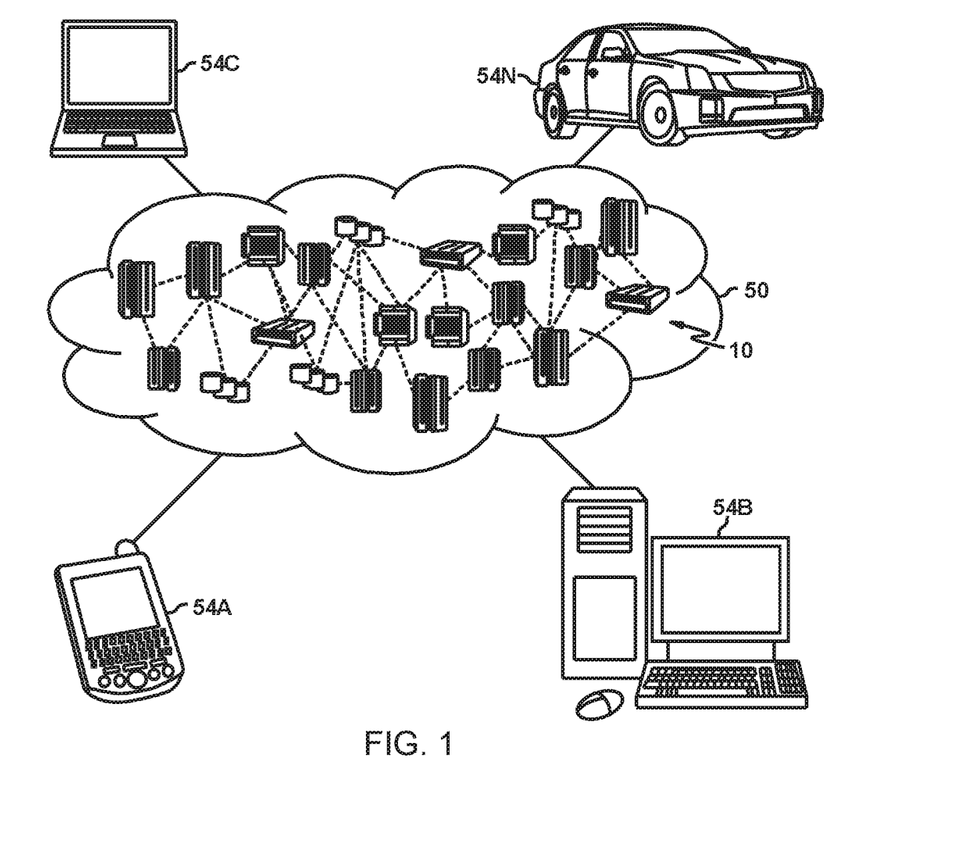
FIG. 1 depicts a distributed computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
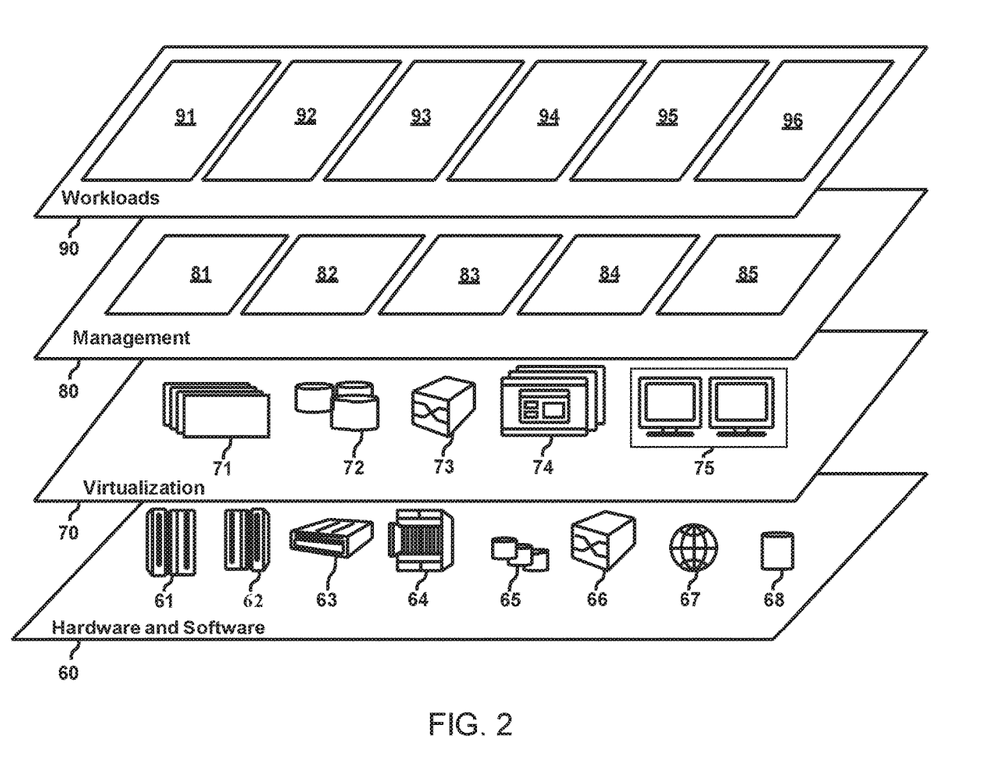
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Metering and Pricing 81 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 82 provides access to the cloud computing environment for consumers and system administrators. Service level management 83 provides cloud computing resource allocation and management such that required service levels are met. Service Level Agreement (SLA) planning and fulfillment 84 provide pre-arrangement for, and procurement of, cloud computing resources for which a future requirement is anticipated in accordance with an SLA. Resource provisioning 85 provides dynamic procurement of computing resources and other resources that are utilized to perform tasks within the cloud computing environment.

In various embodiments and scenarios, resource provisioning 85 provides workload inspection and workload scheduling. As discussed herein, workload inspection provides monitoring capabilities of the various resources and activity associated with the various workloads as represented by workloads layer 90. Workload scheduling provides scheduling and resource access to the various workloads as represented by workloads layer 90.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
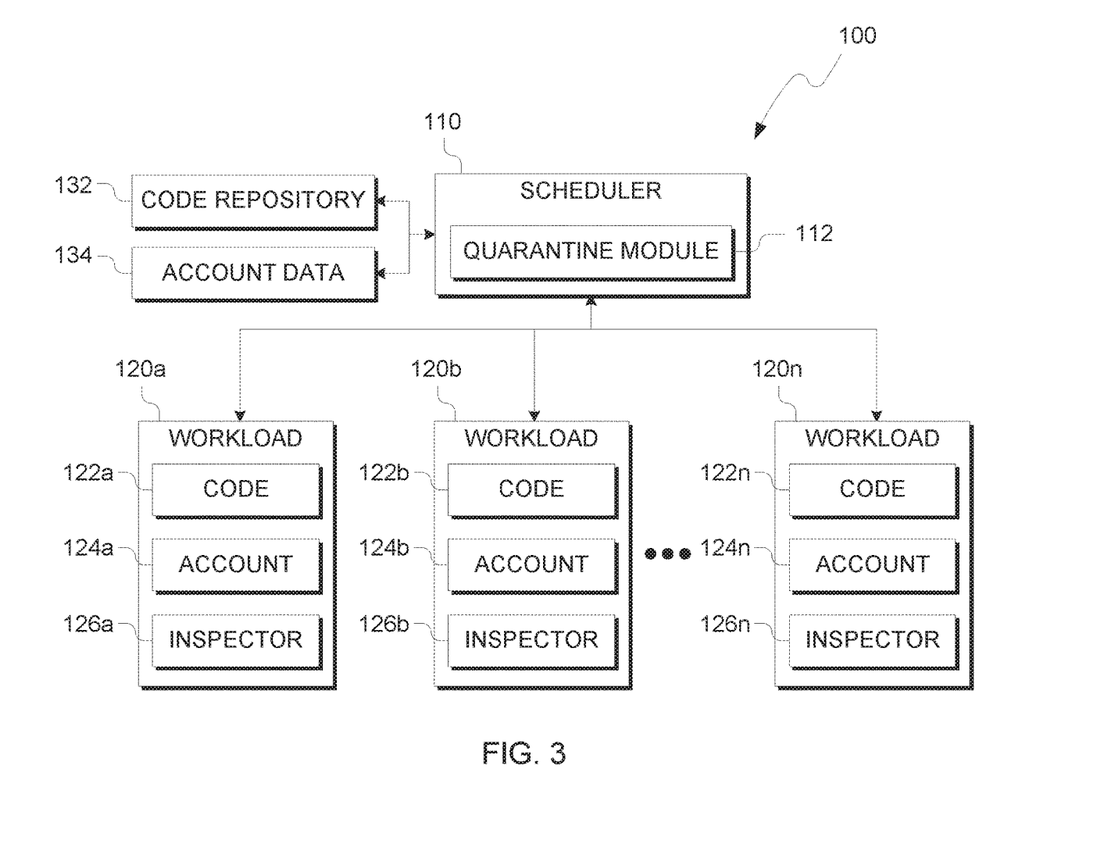
FIG. 3 illustrates a distributed computing environment for scheduling workloads and detecting excessive resource usage, in accordance with an embodiment of the present invention.

FIG. 3 illustrates a distributed computing environment 100 for scheduling workloads 120a-n. Distributed computing environment 100 is a multi-tenant computing environment where a plurality of users with accounts 124a-n provide code 122a-n to be executed by workloads layer 90, as workloads 120a-n. Workloads 120a-n are portable, independent collections of code that can be executed by various hardware and software components of hardware and software layer 60. Workloads 120a-n may be executed by a variety of devices, platforms or services provided by hardware and software layer 60, making workloads 120a-n portable. Additionally, workloads 120a-n include the necessary code, libraries and other files necessary to perform the workload on a variety of devices and platforms, making workloads 120a-n independent. Code 122a-n for the respective workloads 120a-n includes code, or any machine-readable script, batch or set of instructions, as well as any supporting libraries provided by a user associated with the workload.

In various embodiments, workloads 120a-n are stored as containers or logical packages that permit workloads 120a-n to be portable as well as independent to the device or environments that executes the workload. In some embodiments, workloads 120a-n are implemented in a Kubernetes container organization system which packages code 122a-n that can be run on a variety of platform and services provided by hardware and software layer 60. One of ordinary skill in the art will appreciate that any containerization method may be used to provide the portability of workloads in distributed computing environment 100 without deviating from the invention.

In various embodiments, distributed computing environment 100 provides features and mechanisms for users to create accounts. Each workload 120a-n has an associated account which comprises various account information such as, but not limited to, account history, age of the account, account type, frequency of resource deployment, frequency of resource deletion, prior quarantines or other accounts with similar information as the account information associated with the workload. Account history indicates the types of applications, code, and services that the account has accessed or requested from distributed computing environment 100. Age of the account indicates the time of creation of the account and how long the account has been active. Account type indicates the type of account the user has created or selected (e.g., paid, free, or any other type of tiering for services provided by distributed computing environment 100). Frequency of resource deployment indicates the rate in the account history that a user account has made the request to deploy resource or perform workloads in distributed computing environment 100. Frequency of resource deletion is the rate of in the account history that a user account has made the request to remove resources from workloads or the rate at which the user account has terminated workloads. Prior quarantines provide the current quarantine status of the account, as discussed herein, as well as any previous changes in quarantine status of the account. Additionally, account information may also include information indicating other accounts with similar information as the user account (e.g., accounts created at nearly the same time, such as within an hour, and accounts created from IP addresses associated with similar geographical locations).

In various embodiments, scheduler 110 is a service of management layer 80 that facilitates and assigns execution to virtualization layer 70 of the various ongoing workloads 120a-n currently being handled by distributed computing environment 100. Scheduler 110 identifies various virtualized hosts within virtualization layer 70 based on a variety of factors, such as the capabilities and availability of said hosts. Additionally, as discussed herein, scheduler 110, includes quarantine module 112 which changes, or otherwise alters, the scheduling of workloads 120a-n, and in some scenarios quarantines or ceases a workload of workloads 120a-n, based on a determined likelihood of excessive resource usage associated with workloads 120a-n.

In some embodiments, each workload 120a-n includes a respective inspector 126a-n that examines the respective code 122a-n for the respective workload (e.g., inspector 126a-n are services incorporated into the container and execute by a host in virtualization layer 70). In other embodiments, inspector 126 is a service of management layer 80 that examines the respective code 122a-n for each workload 120a-n. In various embodiments, inspector 126 compares the respective code 122a-n for each workload 120a-n to code repository 132 to determine if the respective code 122a-n includes any known patterns of excessive resource usage. Inspector 126 reviews code 122 of code 122a-n for a respective workload 120 of workloads 120a-n for various patterns that have been provided to code repository 132 as being indicative of potential excessive resource usage.

One aspect inspector 126 reviews are string patterns residing in code 122. For example, function calls, uniform resource locators (URLs) and other components of code associated with excessive resource usage are compared to code repository 132 by inspector 126, with code repository 132 including known string patterns that are indicative of potential excessive resource usage. Another aspect inspector 126 reviews are process patterns. Some code 122 may include various threads or processes that contribute to or service other portions of code 122, with code repository 132 including known process or thread names that are indicative of potential excessive resource usage. Another aspect inspector 126 reviews are file patterns. Some code 122 may produce output files that may provide a finalized output to a user of the executed workload or may also be passed along to another component of code 122. Aspects such as file name, size, and contents are compared by inspector 126 to code repository 132, with code repository 132 including known output or intermediary files that are indicative of potential excessive resource usage.

Another aspect inspector 126 reviews are operational activities of workload 120 of workloads 120a-n. As a workload is deployed in distributed computing environment 100, various activities occur that consume or use various resources of hardware and software layer 60. For example, when workload 120 is deployed by management layer 80 and hosted by virtualization layer 70, a certain percentage of a central processing unit (CPU) or CPUs for devices in hardware and software layer 60 is utilized. As another example, some workloads may require upload and download bandwidth from networking components in hardware and software layer 60. In both examples, inspector 126 monitors such operational activities of workload 120.

In various embodiments, inspector 126 evaluates each account 124 associated with the respective workload 120 of workloads 120a-n. Account data 134 includes the various account information discussed herein such as, but not limited to, account history, age of the account, account type, frequency of resource deployment, frequency of resource deletion, prior quarantines or other accounts with similar information as the account information associated with the workload. As discussed herein, some activity of excessive resource usage in multi-tenant computing utilizes more than one account to be effective. By reviewing and determining excessive resource usage based on account information, inspector 126 can detect and act upon a greater number of potential excessive resource usage from workloads 120a-n.

In various embodiments, inspector 126 determines a likelihood that a workload may be associated with excessive resource usage. Inspector 126 separates the various information from string, process and file patterns, operational activities and account information associated with a workload 120 into a vector, with each element or dimension of the vector associated with an item selected from the above information. For each item, inspector 126 determines the likelihood that the item of information is indicative of resource excess. For string, process and file patterns, inspector 126 compares code 122 of workload 120 to code repository 132 to identify and match patterns that indicate potential excessive resource usage associated with code 122. For operational activities, inspector 126 monitors network and resource usage of workload 120 that exceed certain thresholds or match usage patterns indicative of excessive resource usage associated with code 122.

For account information, inspector 126 identifies patterns in the particular account associated with a workload, as well as other accounts stored in account data 134. In various embodiments, inspector 126 compares account 124 to other accounts in account data 134 to determine whether account 124 shares any patterns associated with prior identified resource excessive accounts in account data 134. For example, inspector 126 compares the number and type of applications, services or other functions of workloads 120a-n that are currently or have been deployed by accounts 124 to other resource excessive accounts in account data 134. For accounts 124a-n that match a similar deployment pattern to resource excessive accounts in account data 134, inspector 126 determines that potential excessive resource usage is occurring in regard to this dimension of the likelihood vector.

In various embodiments, inspector 126 compares the account creation information to other accounts in account data 134 to identify similar accounts. For example, inspector 126 compares account 124 to account data 134 to identify the number of accounts that are created within a certain time frame (e.g., some users may create numerous accounts in succession to coordinate a multitude of workloads that provide a malicious attack, such as a denial of service attack, that will require a large amount of computing resources of distrusted computing environment 100). Additionally, inspector 126 compares the log-in or account creation location, IP address or other geolocation data associated with account 124 to account data 134 to determine if account 124 shares similar access locations from users (e.g., some users may create numerous accounts originating from the same device, network or location).

In some scenarios, some users who target a multi-tenant distributed computing environment for computing resources create a variety of accounts to either coordinate large scale actions within the distrusted computing environment or to maintain access to the system if one account is compromised. In various embodiments, inspector 126 compares various patterns of account usage and access to distrusted computing environment 100 to determine if the accounts have similar usage patterns that may indicate that the accounts are owned or operated by a single user or group of users. Inspector 126 compares patterns of usage such as similar log-in location (e.g., accounts who access within a given IP address range or similar geo-location), times of log-in and access to the accounts (e.g., a coordinated group of accounts operated by a malicious actor may be accessed sequentially or one at a time as the actor performs actions and uploads code for each account), or durations of log-ins or other activity (e.g., malicious actors may quickly upload code to a variety of accounts and log out after uploading is complete).

In various embodiments, inspector 126 selects one or more dimensions for a likelihood vector that indicates across string, process and file patterns, operational activities and account information associated with a workload 120 if an account and associated workload may be performing activity that will result in excessive resource usage within distributed computing environment 100. For example, inspector 126 generates a likelihood vector with the following dimensions [Code_Patterns, File_Patterns, Process_Patterns, Network_Patterns, Account_Consistency, Account_Similarity, Account_Type, Account_Creation]. Code_Patterns, File_Patterns, Process_Patterns, and Network_Patterns reflect the likelihood the code, files, processes and network activity associated with a workload may indicate excessive resource usage. Account_Consistency, Account_Similarity, Account_Type, and Account_Creation reflect the likelihood the various account information associated with a workload may indicate excessive resource usage. In various scenarios, each element of the vector indicates a likelihood each element indicates possible excessive resource usage. For example, a resultant likelihood vector may have the values [0 (Code_Patterns), 0.2 (File_Patterns), 0.3 (Process_Patterns), 0.1 (Network_Patterns), 0.2 (Account_Consistency), 0.9 (Account_Similarity), 0.8 (Account_Type), 0.8 (Account_Creation)]. In this above example, inspector 126 determines there is a likelihood score of 0.9 that this workload has an account similar to other known resource excessive accounts, indicating that the account is likely to use an excess of resources based on this dimension. Conversely, inspector 126 determines there is a likelihood score of 0.1 for network patterns of the workload matching resource excessive network activity, indicating that the network activity of the workload is likely to use an excess of resources.

One of ordinary skill in the art will appreciate that the likelihood vector generated by inspector 126 may include or exclude any dimension, as discussed herein, without deviating from the invention. Additionally, in some embodiments, as discussed herein, inspector 126 includes machine learning aspects that automatically select and remove dimensions in the likelihood vector, based on training and previous determinations of likely excess of resource usage by both workloads and accounts.

In some embodiments, inspector 126 determines values for the likelihood vector based on the analysis of particle filter or sequential Monte-Carlo methods. Monte-Carlo particle filters uses a set of particles, or samples, to represent the distribution of some stochastic process, or in this scenario the processes that lead certain actions to likely indicate excess usage of resources. Particle filter techniques provide a process for generating samples from the required distribution without requiring assumptions about the state-space model or the state distributions.

For example, inspector 126 has selected Account_Consistency as an element in the likelihood vector. Inspector 126 constructs a vector for the Account_Consistency element that is represented as [(number of applications), (average memory usage), (number of services)], which is constructed for each account to create a series of vector samples. Collectively, the vector samples are combined to form a Gaussian distribution. When a new account creates or uploads a new application in distributed computing environment 100, inspector 126 calculates the Account_Consistency likelihood for the new application by comparing the vector for the new application to the gaussian distribution generated from combining the historical Account_Consistency vectors of all other known applications. Based on this comparison, inspector 126 determines the likelihood that the new application falls within the overall distribution, generating a value between 0 and 1.

One of ordinary skill in the art will appreciate that as new accounts are created and new applications uploaded, the historical gaussian distribution for Account_Consistency may change. In various embodiments and scenarios, inspector 126 includes machine learning and training, both supervised and unsupervised, to adjust and account for such fluctuations. For example, inspector 126 may have certain threshold values for excessive resource usage, such as a ceiling value for memory usage. Based on the historic usage of memory for various workloads, inspector 126 determines a threshold value that falls under a certain percentage of the historical gaussian distribution (e.g., 95% of applications use memory). In various embodiments and scenarios, inspector 126 changes the threshold values based on changes in usage over time.

In other scenarios and embodiments, inspector 126 includes machine learning for selecting and removing dimensions from the likelihood vector. For example, one or more historical workloads have been analyzed and found to use an excessive amount of resources in distributed computing environment 100. Based on the categorization of the historical workloads as being resource excessive, inspector 126 compares the workloads to the current model. If the current model fails to properly classify the historical workloads as resource excessive, inspector 126 selects one or more dimensions to remove or add to the likelihood vector. If the updated vector has a higher score, then inspector 126 includes the dimension in future calculations. Similarly, if removal of a dimension increases the overall score, then inspector 126 excludes the dimension in future calculations.

In various embodiments, inspector 126 combines each of the likelihood dimension values to create an overall excessive resource usage likelihood score for a workload 120 in distributed computing environment 100. Inspector 126 applies a weighted average to the dimensions of the likelihood vector. Inspector 126 compares the weighted average to a threshold value. For values that exceed the threshold value, inspector 126 categorizes the workload 120 as possibly being resource excessive and sends the indication to scheduler 110, which in turn places workload 120 into a tiered stage of quarantine. For example, scheduler 110 has four tiers of quarantine. For workloads with an excessive resource usage likelihood score of less than 0.2, then scheduler 110 places no limits or restrictions on workload 122. For workloads with an excessive resource usage likelihood score of less than 0.45, then scheduler 110 places some limits to resource usages, but maintains the workload 120 in a trusted cluster of distributed computing environment 100. For workloads with a higher score than the previous tiers (e.g., above 0.45), scheduler 110 places workload 120 into a special quarantine cluster that may restrict services and other features provided by distributed computing environment 100. And for workloads that exceed a fourth threshold value (e.g., 0.9), then scheduler 110 terminates the workload. Additionally, for workloads with a large excessive resource usage likelihood score (e.g., above 0.90), inspector 126 includes the workload 120 and account 124 data in future machine learning and classification training sessions. One of ordinary skill in the art will appreciate that various threshold tiers and scheduling of workloads 120*a-n* may be used without deviating from the invention.

In some embodiments, scheduler 110 includes quarantine tiers categorized based on the type of excessive resources a workload is determining to be likely is usage excess. For example, one quarantine tier that scheduler 110 maintains is a cluster for workloads that are likely to use excess CPU resources, while another tier is for workloads that are likely to use excess network resources. In some embodiments and scenarios, scheduler 110 quarantines likely resource excessive workloads to a tier associated with the dimension of the likelihood vector that has the largest value.

In other embodiments, scheduler 110 creates quarantine tiers for likely resource excessive workloads in order stagger or mitigate the impact of resource excess the workloads may incur. Scheduler 110 groups resource excessive workloads such that the likelihood dimensions of the workloads are not focused on a single dimension, but that the overall average of the resource dimensions are balanced. For example, scheduler 110 places a memory resource excessive workload and a CPU resource excessive workload in the same tier, while another memory resource excessive workload would be placed in another tier to balance the impact the clustered workloads have on a tier.

In various embodiments, inspector 126 continues evaluating workloads 120*a-n* for likelihood of resource excess. If a given workload changes operational aspects (e.g., new code 122) or otherwise a new excessive resource usage likelihood score is determined (e.g., such a updated training of the machine learning aspects of inspector 126), then inspector 126 assigns a new excessive resource usage likelihood score to the workload, with scheduler 110 rescheduling the workload accordingly.

Figure 4:
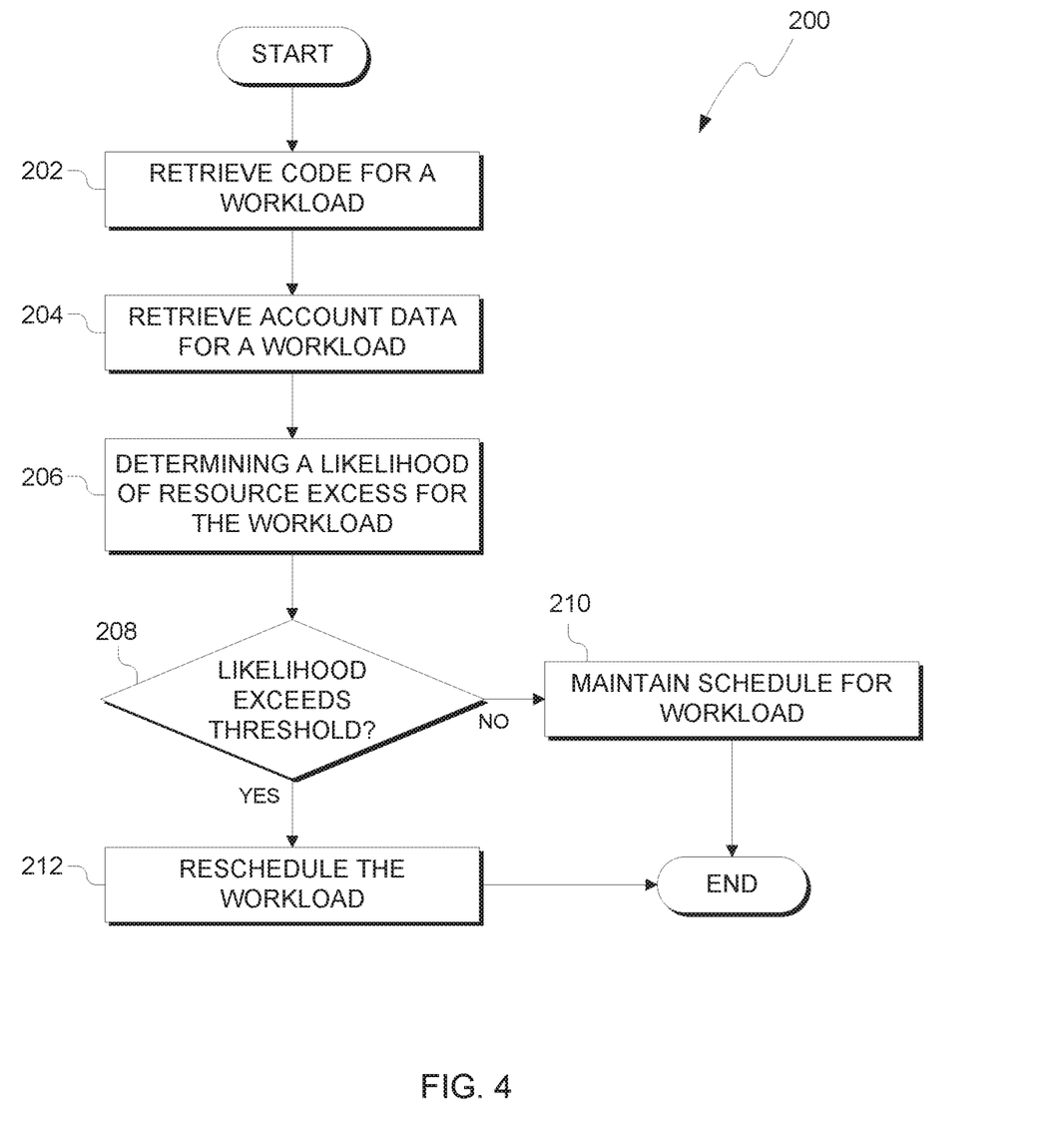
FIG. 4 illustrates operational processes of an inspector and a scheduler identifying excessive resource usage and scheduling workloads in a distributed computer environment, in accordance with an embodiment of the present invention.

FIG. 4 illustrates operational processes, generally designated 200, of inspector 126 and scheduler 110 identifying excessive resource usage and scheduling workloads in distributed computing environment 100. In processes 202 and 204, inspector 126 retrieves code and account information associated with a workload 120 of workloads 102*a-n* scheduled to run or running in distributed computing environment 100. In some scenarios, inspector 126 is included in a containerized workload 120 which includes the code and libraries to inspect workload 120, underlying code 122 and associated account 124. In other embodiments, inspector 126 is a service of distributed computing environment 100 that works in conjunction with other services of distributed computing environment 100, such as scheduler 110.

In process 202, inspector 126 retrieves code 122 for a workload 120 of workloads 120*a-n*. Code 122 may include, but is not limited to, any program code syntax, libraries, or other supporting software required to perform workload 120. In process 204, inspector 126 retrieves account information associated with account 124 which has uploaded, sent or otherwise provided code 122 for execution in distributed computing environment 100. In process 206, inspector 126 determines a likelihood of excessive resource usage for the workload 120, which is described in detail in FIG. 5.

Figure 5:
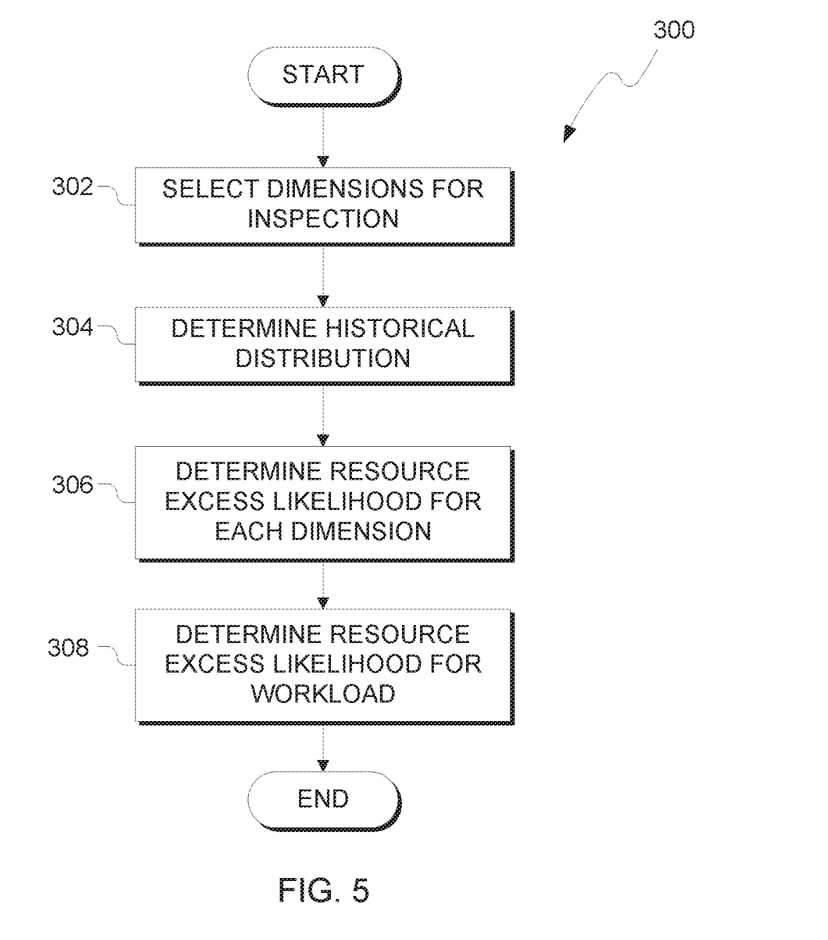
FIG. 5 illustrates operational processes of an inspector determining the likelihood a workload will be resource excessive, in accordance with an embodiment of the present invention.

FIG. 5 illustrates operational processes, generally designated 300, of inspector 126 determining the likelihood a workload is resource excessive. In process 302, inspector 126 selects from various factors related to code 122 and account 124 for inspection. As discussed herein, inspector 126 evaluates code 122 based on, but not limited to, one or more of the following: string patterns, process patterns, file patterns, network patterns or resource patterns associated with the syntax of code 122, as well as the performance and other usage patterns related to the execution of code 122 in distributed computing environment 100. Inspector 126 evaluates account 124 based on, but not limited to, one or more of the following: account history, age of the account, account type, frequency of resource deployment, frequency of resource deletion, prior quarantines or other accounts with similar information as the account information associated with the workload.

In process 302, inspector 126 selects from the above dimension related to code 122 and account 124 associated with a workload 120. In some embodiments, inspector 126 includes all or a predetermined selection of the above. In other embodiments, over time and based on changing historic data, inspector 126 changes the selected dimensions. For example, inspector 126 includes machine learning models that are updated based on changing historic data of prior workloads which trains inspector 126 to choose different dimension as classifiers for excessive resource usage.

In process 304, inspector 126 determines a historical distribution of prior workloads to determine if the currently evaluated workload 120 matches prior excessive resource usage in the historical distribution of prior workloads. For example, inspector 126 includes one or more particle filters and performs sequential Monte-Carlo analysis of prior workloads to determine a historical distribution of the values for the selected dimensions. In process 306, inspector 126 determines a resource excessive likelihood for each dimension. Based on the historical distribution of prior workloads determined in process 304, inspector 126 determines the likelihood that the workload will be resource excessive. For example, in scenarios where a particle filter is utilized in process 304, inspector 126 will generate a Gaussian distribution, or bell-shaped curve, with a given mean and variance. Inspector 126 compares the value associated with the workload 120 of the dimension being evaluated to the Gaussian distribution determined in process 304. For workloads with values close (e.g., within a predetermined distance) to the mean or center point of the Gaussian distribution, inspector 126 determines a low resource excessive likelihood value for the selected dimension. For workloads with values further away (e.g., at least a predetermined distance) from the mean value, inspector 126 determines a high resource excessive likelihood value for the selected dimension.

In process 308, inspector 126 determines a resource excessive likelihood for the workload being evaluated. In some scenarios, inspector 126 calculates a weighted sum of each dimension selected in process 302, where the weights are trained and altered based on historically trained machine learning models. In other scenarios, inspector 126 evaluates each dimension value and if a dimension is at or above a predetermined threshold value, then inspector 126 assigns a high resource excessive likelihood for the workload, regardless of the values for other dimensions. For example, if a Code_Pattern dimension is determined to be greater than 95%, then inspector 126 determines a 100% resource excessive likelihood for the workload 120.

Referring back to FIG. 4, in process 208 inspector 126 compares the determined resource excessive likelihood for the workload to one or more predetermined threshold values. For example, inspector 126 has various tiers related to various escalations of quarantine for the workload. If the resource excessive likelihood for the workload exceeds any of the threshold values (YES branch of process 208), then inspector 126 sends the resource excessive likelihood to scheduler 110 to reschedule the workload (process 212). Rescheduling includes, but is not limited to, one or more of the following: placing the workload into a trusted or quarantined zone of the distributed computer environment 100, limiting or restricting access to resources or services, or terminating the workload. If the resource excessive likelihood has not changed beyond the one or more threshold values (NO Branch of process 208), i.e., the resource excessive likelihood is below a predetermined threshold value, then inspector 126 instructs scheduler 110 to maintain the current scheduling for the workload (process 210). In some embodiments, inspector 126 passes along the resource excessive likelihood for the workload to scheduler 110, which in turn alters the scheduling of the workload, as discussed herein.

Figure 6:
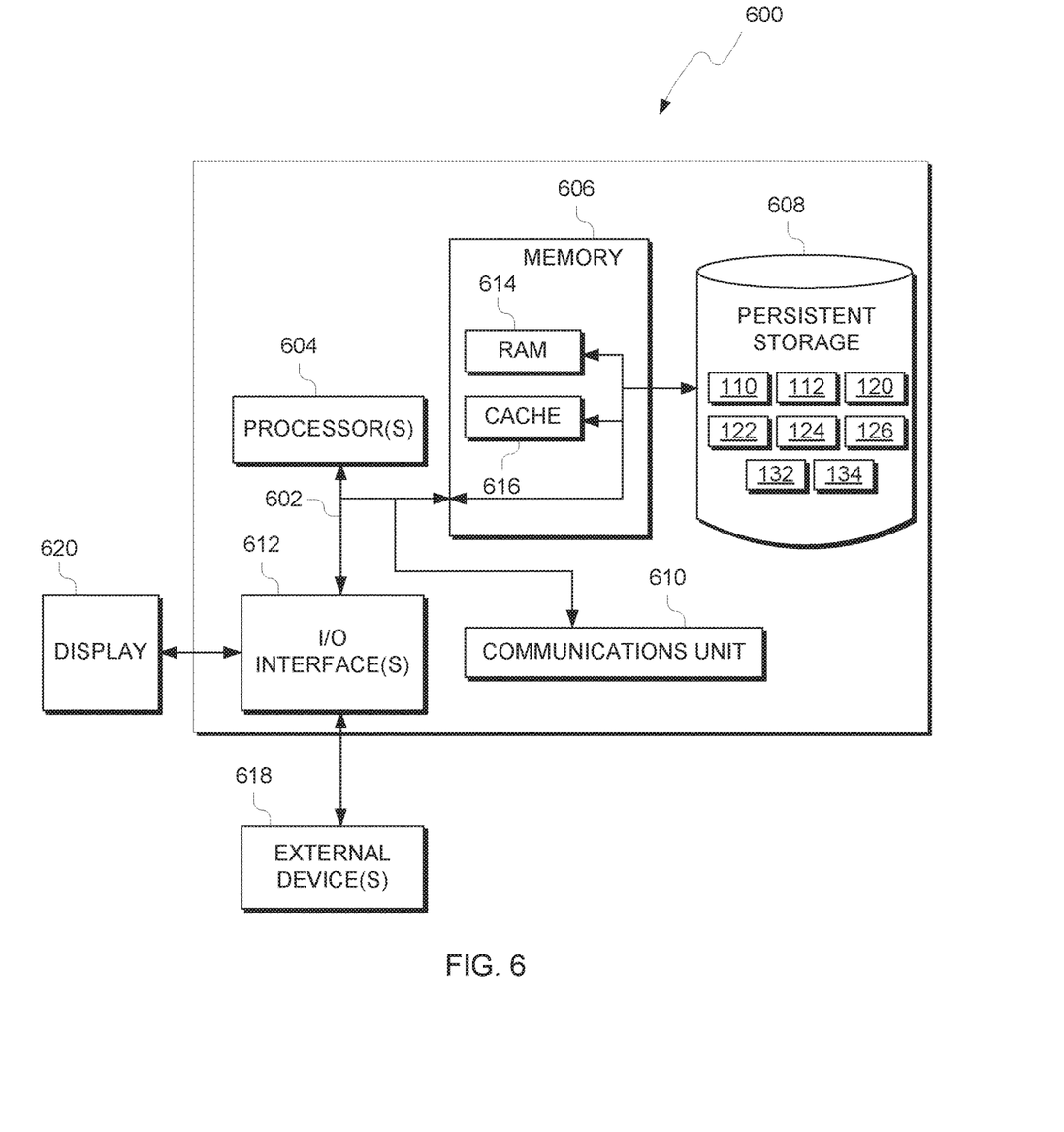
FIG. 6 depicts a block diagram of components of the computing device executing an inspector and a scheduler, in accordance with an exemplary embodiment of the present invention.

FIG. 6 depicts a block diagram, 600, of components of scheduler 110 and inspectors 126a-n, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Scheduler 110 and inspectors 126a-n includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Scheduler 110 and inspectors 126a-n include data and programs, to perform the methods discussed herein, that are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of distributed computing environment 100. In these examples, communications unit 610 includes one or more network interface cards. Communications unit 610 may provide communications through the use of either or both physical and wireless communications links. Various data and programs may be downloaded to persistent storage 608 through communications unit 610 to perform the methods discussed herein.

I/O interface(s) 612 allows for input and output of data with other devices that may be connected to scheduler 110 and inspectors 126a-n. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
   retrieving, by one or more processors, at least a portion of code associated with a workload in a distributed computing environment;
   retrieving, by the one or more processors, account information associated with the workload;
   determining, by the one or more processors, a likelihood that the workload is indicative of excessive resource usage based, at least in part, on the portion of code and the account information associated with the workload, wherein the determining includes determining that the likelihood of excessive resource usage has exceeded a threshold;
   in response to the likelihood of excessive resource usage exceeding the threshold, rescheduling, by the one or more processors, the workload in the distributed computing environment, wherein rescheduling the workload in the distributed computing environment comprises scheduling the workload in a quarantine cluster of the distributed computing environment, wherein the likelihood that the workload is indicative of excessive resource usage is based on one or more of string patterns, process patterns, or file patterns of the portion of the code, and wherein the likelihood that the workload is indicative of excessive resource usage is based on one or more of the following aspects of the account information: frequency of resource deployment, frequency of resource deletion, or prior quarantines of the workload; and
   executing the workload in the quarantine cluster.

2. The method of claim 1, wherein the likelihood that the workload is indicative of excessive resource usage is based on the following aspects of the account information: account history, age of the account, account type, frequency of resource deployment, frequency of resource deletion, prior quarantines of the workload, and other accounts with information matching the account information associated with the workload.

3. The method of claim 1, wherein the likelihood that the workload is indicative of excessive resource usage is based on the following aspects of the portion of code: string patterns, process patterns, and file patterns.

4. The method of claim 1, wherein the likelihood that the workload is indicative of excessive resource usage is based on at least two of the following aspects of the portion of code: string patterns, process patterns, or file patterns.

5. The method of claim 1, wherein the likelihood that the workload is indicative of excessive resource usage is based on string patterns and process patterns of the portion of the code.

6. The method of claim 1, wherein the likelihood that the workload is indicative of excessive resource usage is based on string patterns and file patterns of the portion of the code.

7. The method of claim 1, wherein the likelihood that the workload is indicative of excessive resource usage is based on process patterns and file patterns of the portion of the code.

8. The method of claim 1, wherein the likelihood that the workload is indicative of excessive resource usage is based on string patterns of the portion of the code.

9. The method of claim 1, wherein the likelihood that the workload is indicative of excessive resource usage is based on process patterns of the portion of the code.

10. The method of claim 1, wherein the likelihood that the workload is indicative of excessive resource usage is based on file patterns of the portion of the code.

11. The method of claim 1, wherein the likelihood that the workload is indicative of excessive resource usage is based on string patterns of the portion of the code, as determined by identification of known string patterns indicative of excessive resource usage.

12. The method of claim 1, wherein the likelihood that the workload is indicative of excessive resource usage is based on process patterns of the portion of the code, as determined by identification of threads contributing to or servicing the portion of the code that are indicative of excessive resource usage.

13. The method of claim 1, wherein the likelihood that the workload is indicative of excessive resource usage is based on file patterns of the portion of the code, as determined by examination of output files produced by the portion of the code.

14. The method of claim 1, wherein the likelihood that the workload is indicative of excessive resource usage is based on two or more of string patterns, process patterns, network patterns, resource patterns, or file patterns of the portion of the code.

15. The method of claim 1, wherein the likelihood that the workload is indicative of excessive resource usage is based on the following aspect of the account information: frequency of resource deployment.

16. The method of claim 1, wherein the likelihood that the workload is indicative of excessive resource usage is based on the following aspect of the account information: frequency of resource deletion.

17. The method of claim 1, wherein the likelihood that the workload is indicative of excessive resource usage is based on the following aspect of the account information: prior quarantines of the workload.

18. The method of claim 1, wherein the likelihood that the workload is indicative of excessive resource usage is based on two or more of the following aspects of the account information: frequency of resource deployment, frequency of resource deletion, or prior quarantines of the workload.

19. A computer system for predicting excessive resource usage in a distributed computing environment, the computer system comprising:
   one or more computer processors;
   one or more computer readable storage media; and
   program instructions stored on the computer readable storage media for execution by at least one of the one or more processors, the program instructions executable for performance of operations comprising:
   retrieving at least a portion of code associated with a workload in a distributed computing environment;
   retrieving account information associated with the workload;
   determining, by the one or more processors, a likelihood that the workload is indicative of excessive resource usage based, at least in part, on the portion of code and the account information associated with the workload, wherein the determining includes determining that the likelihood of excessive resource usage has exceeded a threshold;

in response to the likelihood of excessive resource usage exceeding the threshold, rescheduling, by the one or more processors, the workload in the distributed computing environment, wherein rescheduling the workload in the distributed computing environment comprises scheduling the workload in a quarantine cluster of the distributed computing environment, wherein the likelihood that the workload is indicative of excessive resource usage is based on one or more of string patterns, process patterns, or file patterns of the portion of the code, and wherein the likelihood that the workload is indicative of excessive resource usage is based on one or more of the following aspects of the account information: frequency of resource deployment, frequency of resource deletion, or prior quarantines of the workload; and executing the workload in the quarantine cluster.

20. A computer program product for predicting excessive resource usage in a distributed computing environment, the computer program product comprising:

one or more computer-readable storage media and program instructions stored on the one or more computer-readable storage media, the program instructions executable by one or more processors for performance of operations comprising:

retrieving at least a portion of code associated with a workload in a distributed computing environment;

retrieving account information associated with the workload;

determining a likelihood that the workload is indicative of excessive resource usage based, at least in part, on the portion of code and the account information associated with the workload, wherein the determining includes determining that the likelihood of excessive resource usage has exceeded a threshold;

in response to the likelihood of excessive resource usage exceeding the threshold, rescheduling, by the one or more processors, the workload in the distributed computing environment, wherein rescheduling the workload in the distributed computing environment comprises scheduling the workload in a quarantine cluster of the distributed computing environment, wherein the likelihood that the workload is indicative of excessive resource usage is based on one or more of string patterns, process patterns, or file patterns of the portion of the code, and wherein the likelihood that the workload is indicative of excessive resource usage is based on one or more of the following aspects of the account information: frequency of resource deployment, frequency of resource deletion, or prior quarantines of the workload; and executing the workload in the quarantine cluster.

\* \* \* \* \*